Sept. 12, 1939.  S. CLAUSEN  2,172,834
SAFETY DEVICE FOR CIGAR SHAPERS
Filed Dec. 12, 1934  2 Sheets-Sheet 1
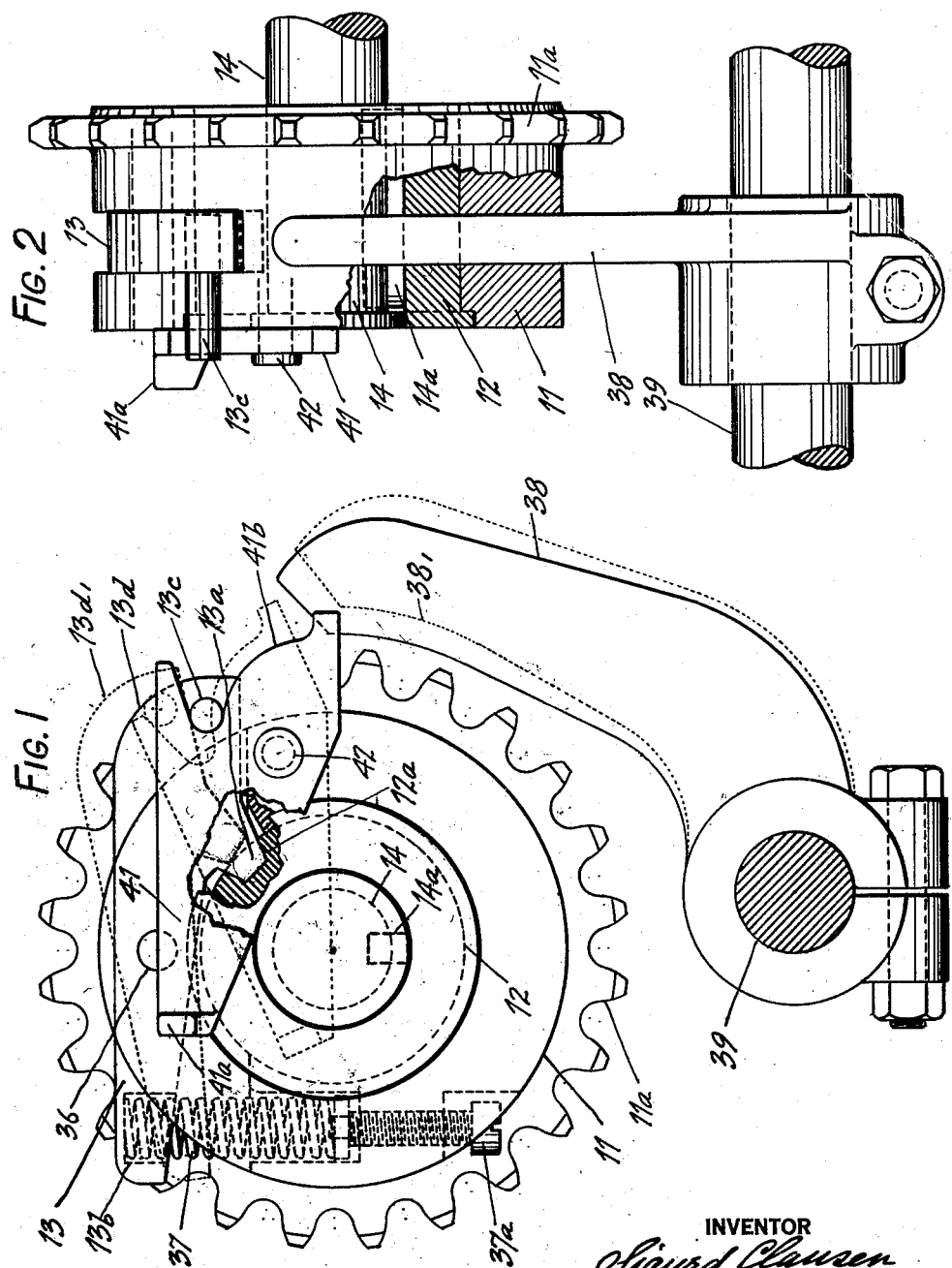
INVENTOR
Sigurd Clausen
BY Sydney P. Prescott
ATTORNEY

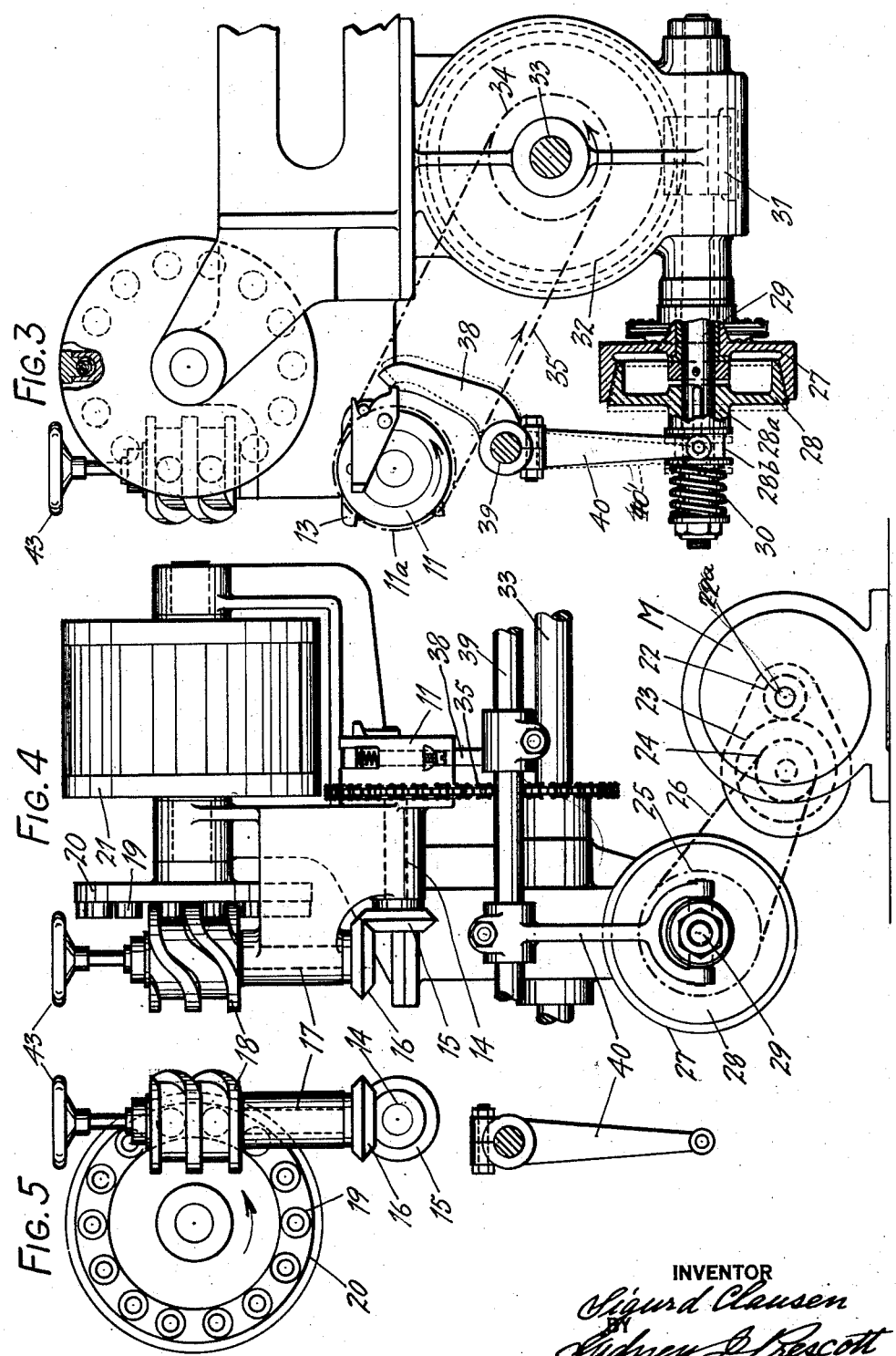

Patented Sept. 12, 1939

2,172,834

UNITED STATES PATENT OFFICE 2,172,834

SAFETY DEVICE FOR CIGAR SHAPERS

Sigurd Clausen, Brooklyn, N. Y., assignor to International Cigar Machinery Company, a corporation of New York Application December 12, 1934, Serial No. 757,228

10 Claims. (Cl. 131—9)

This invention relates to an improved safety device for preventing damage to machinery in case some undue resistance is encountered in a power-driven mechanism.

Accordingly, the main object of the invention is to provide a novel safety device which will stop the power-driven mechanism, and the entire machine if desired, whenever the movement of the power-driven mechanism is obstructed.

The safety device would have useful application in many widely different kinds of machines, but in the embodiment chosen to illustrate the invention the safety device is shown, in a scrap bunch cigar machine, interposed between the drive mechanism and the turret indexing mechanism of the cigar bunch concentrator or other type of cigar shaper. A further object of the invention, therefore, is to incapacitate the drive mechanism of the cigar shaper and stop the entire machine when the rotation of the cigar shaper is obstructed.

With these and other objects not specifically mentioned in view, the invention consists in certain constructions and combinations hereinafter fully described and then specifically set forth in the claims hereunto appended.

In the accompanying drawings which form a part of this specification and in which like characters of reference indicate the same or like parts:

Fig. 1 is a front elevation of the safety device;

Fig. 2 is a side elevation of the same;

Fig. 3 is a front view showing the device as installed in a cigar bunch concentrator to connect the drive mechanism and turret indexing mechanism thereof;

Fig. 4 is a side view of the same; and

Fig. 5 is a detail rear view of the turret indexing mechanism of the cigar bunch concentrator.

In the particular embodiment of the invention selected for illustration for carrying the invention into effect there is provided, in combination, the main drive shaft of a cigar machine, a revoluble cigar bunch shaper turret, mechanism driven from said main shaft and operating periodically to revolve said shaper turret, a clutch through which said main shaft is driven, and an automatic safety device for incapacitating said mechanism and throwing said clutch out of gear whenever the rotation of said turret is obstructed, whereby the rotation of said turret will be interrupted and the entire machine will be stopped. In the best constructions contemplated said device includes a spring-pressed clutch lever normally holding the clutch in gear, a trip lever connected to the clutch lever, a jack shaft, a notched sleeve fast to the jack shaft, a sprocket driven from the main shaft and loose on the sleeve, and a spring pawl pivoted on the sprocket and provided with a lug adapted to engage said notch to turn the jack shaft in unison with the sprocket and slip out of the notch whenever the rotation of the turret is obstructed, and also provided with a heel adapted to strike the trip lever and thus actuate the clutch lever to throw the clutch out of gear whenever the lug on the pawl slips out of the notch. These various means and parts may be widely varied in construction within the scope of the claims for the particular device selected to illustrate the invention is but one of many possible concrete embodiments of the same. The invention, therefore, is not to be restricted to the specific construction shown and described.

Referring to the drawings, in Figs. 1 and 2 the safety device is shown apart from the cigar bunch concentrator. In the form of the safety device illustrated therein the hub 11 of a chain sprocket 11a is free to rotate on a sleeve 12 except when the lug 13a of a pawl 13 engages a notch 12a of the sleeve 12. Sleeve 12 is secured by key 14a to a jack shaft 14 on which may be fastened, when the safety device is installed in a cigar bunch concentrator, a bevel gear 15 (Fig. 4) which meshes with a bevel gear 16 on a shaft 17.

On the upper end of the shaft 17 is fastened a drum cam 18. A number of rollers 19 spaced at equal intervals on the indexing disk 20 of the bunch concentrator successively engage the helical cam groove in drum cam 18 as the drum cam rotates; and, as the rollers 19 travel up the ramp in the cam groove of drum 18, the indexing disk 20 is turned together with the turret 21, which carries an endless series of interfitted male and female concentrator sections. In this manner each pair of interfitted male and female concentrator sections is successively stopped at the bunch loading station of the turret where the male section is automatically removed and then replaced after the bunch has been inserted into the female section. Further description of the turret and the mechanism for removing and replacing the male concentrator sections is deemed unnecessary as reference may be had to Patent No. 1,838,157, granted December 29, 1931, on the application of Rupert E. Rundell, for a complete disclosure thereof. The bunches may be manually inserted or this operation may be performed automatically by suitable means such as shown in said patent.

The shaft 22a of the motor M carries a pinion 22 driving the gear 23 on a continuously revolving counter or sprocket shaft to which is fast the sprocket 24. A sprocket 25 is driven from the sprocket 24 by means of chain 26. Sprocket 25 is attached to one clutch member or cone 27 of a friction clutch or other suitable type of clutch, the other clutch member or cone 28 of which is splined to the main drive shaft 29 and held in engagement with the cone 27 by the pressure of the clutch spring 30.

A worm 31 on shaft 29 drives the worm gear 32 on shaft 33, and sprocket 34 on shaft 33 is connected to sprocket 11a by chain 35. Thus there is established a complete connection between the main drive and the index disk, which would be positive and unyielding and would cause breakage of the chain 26 or other damage when the rotation of the turret 21 is obstructed by a male concentrator section not fully seated in its female section due to the insertion therein of an oversize bunch or two bunches simultaneously, were it not for the safety device. The hub 11 of the chain sprocket 11a of the safety device is free to rotate on the sleeve 12 except when the lug 13a of pawl 13 engages the notch 12a, as described above. Pawl 13 is pivoted on a pin 36 in the sprocket gear hub 11, its lug 13a being shaped to fit the notch 12a and its free end 13b being provided with a recess arranged to receive the spring 37 which assists in retaining the lug 13a in the notch 12a.

If any undue resistance should present itself during the operation of the index disk 20 of turret 21, the lug 13a of the pawl 13 would slip out of the notch 12a and the sprocket 11a would rotate freely on the sleeve 12, thus interrupting the rotation of the index disk and preventing any damage. An adjusting screw 37a against which the spring 37 is seated permits of varying the spring pressure on pawl 13 to suit the desired conditions.

A lever or trip 41 pivotally mounted on pin 42 in sprocket hub 11 permits the operator to disengage the lug 13a of pawl 13 from notch 12a in sleeve 12 by manually depressing the end 41a of lever 41. For this purpose the other end 41b of trip 41, which is shaped like an eccentric cam, bears on pin 13c in pawl 13 and raises its lug 13a out of the notch 12a and holds the pawl disengaged from sleeve 12 until the attendant releases the end 41a of the trip. By means of this feature of the safety device the attendant may turn the shaper turret 21 over for inspection and cleaning purposes by turning the hand wheel 43, without disturbing any other part of the machine.

When an interruption in the operation of the index disk 20 has occurred it is usually advisable to stop the main drive shaft of the machine while investigating and eliminating the trouble that caused the safety device to function. This stoppage is automatically accomplished by the safety device. Whenever the pawl 13 slips out of the notch 12a the heel 13d of the pawl 13, as it swings into position 13d¹, encounters trip lever 38 fixed on clutch lever shaft 39. The prongs of the forked lever 40 clamped on shaft 39 ride in groove 28b of the hub 28a of clutch cone 28. As the heel 13d¹ sweeps against trip lever 38, it throws the lever into position 38', Fig. 1, and thereby turns the clutch lever shaft 39 and swings the clutch lever 40 into position 40', Fig. 3, and withdraws the clutch cone 28 from engagement with the clutch cone 27. The clutch cone 27 now rotates freely on the main shaft 29, but can transmit no power to the drive of the machine.

The safety device thus fulfills two important functions—one of which is to disconnect the turret drive when damage to machinery might otherwise be done, and the other is to automatically stop the drive of the entire machine.

From the foregoing disclosure it will also be seen that the shaping mechanism is immediately incapacitated upon overload of the driving mechanism therefor, also that the clutch is subsequently thrown at a predetermined point in the machine cycle to stop the other units of the machine in a predetermined position.

The shaping mechanism, thus incapacitated either automatically by an overload, or manually at will, can, after elimination of the cause of the overload, be rehabilitated manually, this being accomplished by turning the handle 43. This results in rotation of the shaft 17 and its intergeared shaft 14, and the sleeve 12, bringing the notch 12a into position to receive the lug 13a of the pawl 13, so that further rotation of the sleeve 12 by the handle 43 acting through shafts 17 and 14 will eventuate in carrying the cam 41 out of the way of arm 38, and the fork 40 is thus freed to be turned by spring 30 into position to press the cone 28 against cone 27, and thereby rotation of shaft 29 is made effective to drive member 11, pawl 13, sleeve 12 and shafts 14 and 17, so that the cam 18, rotor 20 and drum 21 will again be turned in normal fashion, provided only that there is no obstruction to rotation of the turret.

The control mechanism therefor comprises a hand wheel 43 easily manipulated by the operator with one hand, and a lever 41a easily and conveniently manipulated by his other hand.

For example, if the operator raises the lever 41a with his right hand, that hand is immediately released for attendance upon the drum 21, and his left hand is also available to cooperate in such attendance, for the operator can rely upon the desired stoppage of the other machine units automatically. He can reset the mechanism as above described by the use of his left hand upon wheel 43, while his right hand remains free for attendance upon the shaper.

After such resetting, the machine can be again started in the usual manner, by operation of conventional control devices, not shown.

What is claimed is:

1. In a cigar machine, the combination with the main drive shaft of the machine, of a revoluble cigar bunch shaper turret driven from said main shaft, a clutch through which said main shaft is driven, a spring normally holding the clutch in gear, and an automatic safety device for subsequently throwing said clutch out of gear at a predetermined point in the machine cycle whenever the rotation of said turret is obstructed, whereby the entire machine will be stopped, said device including a spring-pressed clutch lever, a trip lever connected to said clutch lever, a jack shaft, a notched sleeve fast to said jack shaft, a rotatable member driven from said main shaft and loose on said sleeve, and a spring pawl pivoted on said rotatable member and provided with a lug adapted to engage said notch to turn said jack shaft in unison with said rotatable member and slip out of said notch whenever the rotation of said turret is obstructed, and also provided with a heel adapted to strike said trip lever and thus actuate said clutch lever to throw said clutch out of gear whenever the lug on said pawl slips out of said notch.

2. The combination with a main drive shaft, of a clutch through which said shaft is driven, a spring normally holding said clutch in gear, and an automatic safety device for throwing said clutch out of gear, said device including a spring-pressed clutch-operating lever, a trip lever connected to said clutch lever, a jack shaft, a notched sleeve fast to said jack shaft, a rotatable member driven from said main shaft and loose on said sleeve, and a spring pawl pivoted on said rotatable member and provided with a lug adapted to engage said notch to turn the jack shaft in unison with the rotatable member, and also provided with a heel adapted to strike said trip lever and thus actuate said clutch lever to throw said clutch out of gear whenever the lug on said pawl slips out of said notch.

3. A safety device comprising a spring-pressed clutch lever, a trip lever connected to said clutch lever, a jack shaft, a notched sleeve fast to said jack shaft, a driven sprocket loose on said sleeve, and a spring pawl pivoted on said sprocket and provided with a lug adapted to engage said notch to turn said jack shaft in unison with said sprocket, and also provided with a heel adapted to strike said trip lever and thus actuate the clutch lever whenever the lug on said pawl slips out of said notch.

4. A cigar bunch shaping machine comprising, in combination, an endless traveling carrier provided with a series of bunch shaping pockets, intermittent driving means for intermittently moving said carrier to successively bring said pockets to bunch receiving position, a continuously rotating shaft in driving relation to said means, and an overload release associated with said shaft and means and through which said carrier is driven, to permit stoppage of the carrier due to jamming of the carrier or bunches thereon without injury to the machine and without stopping the rotation of said shaft, and means by which said driving means can be moved for rehabilitation of the shaper carrier.

5. In a cigar machine, the combination with a revoluble cigar bunch shaper turret having a series of bunch receiving shaping pockets, of mechanism for intermittently rotating said turret including a driven member connected to said turret and a driving member rotating in timed relation to the main drive shaft of the cigar machine, interengaging means on said driving and driven members for driving the latter from the former having an abutment on one member and a movable element on the other member engageable with the abutment to drive the driven element only when said members are in predetermined timed annular relationship to maintain timing between the turret and the main drive shaft, and means mounting said element to permit disengagement of the element from said abutment when there is an overload on the turret, a clutch through which the main drive shaft of the cigar machine is driven, and mechanism for coacting with said element to disengage said clutch at a predetermined point in the rotation of said main shaft when said element is disengaged in order to stop units of said cigar machine driven from said shaft in predetermined position.

6. In a cigar machine, the combination with the continuously revolving motor shaft of the machine, of a revoluble cigar bunch shaper turret, mechanism driven from said shaft and operating periodically to revolve said shaper turret, a clutch through which said mechanism is driven from said motor shaft, and an automatic safety device for immediately incapacitating said mechanism and subsequently throwing said clutch out of gear at a predetermined point in the machine cycle to stop the other units of the machine in a predetermined position, whenever the rotation of said turret is obstructed, and manually operable means by which said mechanism can be moved for rehabilitation of the shaper turret.

7. In a cigar machine, the combination with the main drive shaft of the machine, of a revoluble member, mechanism driven from said main shaft and operating periodically to revolve said member, a clutch through which said main shaft is driven, and an automatic safety device for immediately incapacitating said mechanism and subsequently throwing said clutch out of gear at a predetermined point in the machine cycle to stop the other units of the machine in a predetermined position whenever the rotation of said member is obstructed, and manually operable means by which said mechanism can be moved for rehabilitation of the revoluble member.

8. In a cigar machine, the combination with the continuously revolving motor shaft of the machine, of a revoluble cigar bunch shaper turret driven from said shaft, periodically operated mechanism for moving said turret, and an automatic safety device for immediately interrupting the rotation of said turret and subsequently stopping the other units of said machine at a predetermined point in the machine in a predetermined position, and manually operable means by which said shaper can be moved for rehabilitation of the shaper turret.

9. In a cigar machine, the combination with a revoluble cigar bunch shaper, of mechanism operating periodically to revolve said shaper, and an automatic safety device for immediately interrupting the rotation of said shaper and subsequently stopping the other units of the machine at a predetermined point in the machine cycle, and manually operable means by which said mechanism can be moved for rehabilitation of the shaper turret, said manually operable rehabilitation control means acting in synchronism with the periodic mechanism to cause restoration of rotating movement to the shaper, at the desired phase of its cyclical movement.

10. In a cigar machine, the combination with the continuously revolving motor shaft of the machine, of a revoluble cigar bunch shaper turret driven from said motor shaft, a clutch through which said turret is driven from said shaft, mechanism operating periodically to revolve said turret, and an automatic safety device for subsequently throwing said clutch out of gear at a predetermined point in the machine cycle, whenever the rotation of said turret is obstructed, and manually operable means by which said mechanism can be moved for rehabilitation of the shaper turret.

SIGURD CLAUSEN.